(12) United States Patent
Tidhar

(10) Patent No.: US 9,612,089 B2
(45) Date of Patent: Apr. 4, 2017

(54) MULTIBAND FLASH DETECTION SYSTEM

(71) Applicant: ELTA SYSTEMS LTD., Ashdod (IL)

(72) Inventor: Gil Tidhar, Modiin (IL)

(73) Assignee: ELTA SYSTEMS LTD., Ashdod (IL)

( * ) Notice: Subject to any disclaimer, the term of this patent is extended or adjusted under 35 U.S.C. 154(b) by 0 days.

(21) Appl. No.: 14/533,498

(22) Filed: Nov. 5, 2014

(65) Prior Publication Data

US 2015/0138534 A1   May 21, 2015

(30) Foreign Application Priority Data

Nov. 18, 2013  (IL) .......................................... 229490

(51) Int. Cl.

| | | |
|---|---|---|
| *F41G 3/14* | (2006.01) |
| *G01J 3/443* | (2006.01) |
| *G01J 3/447* | (2006.01) |
| *G01J 3/36* | (2006.01) |
| *G01J 3/02* | (2006.01) |
| *G01S 3/784* | (2006.01) |
| *H04N 5/33* | (2006.01) |

(52) U.S. Cl.
CPC ............ *F41G 3/147* (2013.01); *G01J 3/0224* (2013.01); *G01J 3/36* (2013.01); *G01J 3/443* (2013.01); *G01J 3/447* (2013.01); *G01S 3/784* (2013.01); *H04N 5/332* (2013.01)

(58) Field of Classification Search
CPC ........ G01J 5/20; G01J 5/08; G01J 5/02; G01J 5/10; H04N 5/33
See application file for complete search history.

(56) References Cited

U.S. PATENT DOCUMENTS

| | | | | |
|---|---|---|---|---|
| 4,701,624 | A | * | 10/1987 | Kern et al. ..................... 250/554 |
| 2006/0039068 | A1 | * | 2/2006 | Tokita et al. .................. 359/483 |
| 2010/0128109 | A1 | * | 5/2010 | Banks .................... G01S 7/4816 |
| | | | | 348/46 |
| 2011/0170798 | A1 | * | 7/2011 | Tidhar .......................... 382/276 |
| 2012/0055990 | A1 | * | 3/2012 | Weiss et al. .................. 235/412 |
| 2014/0022393 | A1 | * | 1/2014 | Cole et al. .................... 348/164 |

OTHER PUBLICATIONS

Jin, Lianhua et al. Stokes parameters of reflected and scattered light by a rough surface. 2009.
Nee, Soe-Mie F.; Polarization of specular reflection and near-specular scattering by a rough surface.; Jul. 1, 1996.
Chen, Hsi-shu et al.; Polarization of light on reflection by some natural surfaces.; 1968.
Shaw, Joseph A.; Degree of linear polarization in spectral radiances from water-viewing infrared radiometers.; May 20, 1999.
Serbanescu, Ruxandra; Polarization of Light.; 2009.
Tidhar, Gil A. et al.; New applications with a SWIR imager employing long wavelengths.; 2011.

* cited by examiner

*Primary Examiner* — David Porta
*Assistant Examiner* — Mamadou Faye
(74) *Attorney, Agent, or Firm* — Oliff PLC

(57) ABSTRACT

A multiband imaging system comprising: an optical module configured for acquiring simultaneously images from a common field-of-view (FOV) scene in a short wavelength spectral band and in a long wavelength spectral band, the optical module comprising a polarizer configured for applying polarization filtering to electromagnetic radiation of the long wavelength spectral band; and a processing module configured to analyze data indicative of received irradiance distribution between the short and long wavelength spectral bands.

21 Claims, 5 Drawing Sheets

MULTIBAND FLASH DETECTION SYSTEM

CROSS-REFERENCE TO RELATED APPLICATIONS

The present application claims priority from Israeli Patent Application No. 229490 entitled "Multiband flash detection system" filed on Nov. 11, 2013.

TECHNOLOGICAL FIELD

The present disclosure relates generally to optical systems. More particularly, the present disclosure relates to a multi spectral imaging system suitable for muzzle flash and detonation detection.

BACKGROUND

Weapon firing events create optical flashes known as muzzle flashes. Muzzle flashes are incandescent flashes at the weapons muzzle caused by the ignition, the expulsion of burning powder grains and the expansion of powder gasses.

Current techniques for detecting firing events attempt to detect such muzzle flashes. At the present time, a few muzzle flash detecting systems can be used in the battle field. Examples of such systems include Radiance Technologies' WeaponWatch™, RAFAEL's SPOTLITE and Maryland Advanced Development Lab's VIPER. The VIPER equipment, for example, consists of a mid-wave infrared (MWIR) camera, together with real-time signal processing, magnetic compass, and user display and alarm. It is advertised as providing gun detection within 70 msec after gunfire and geolocation of the firing event. Using an MWIR-camera also allows concurrently performing forward looking infrared (FLIR) imaging of a region of interest.

GENERAL DESCRIPTION

The present disclosure proposes a system and method for efficiently detecting muzzle flash and detonation events.

The Applicant has found that by using a multiband imaging system including a long wavelength optical band, as for example a shortwave infrared (SWIR) band at 1.5 µm-1.7 µm, and a short wavelength optical band, as for example a visible band at 0.5 µm-0.6 µm, it is possible to detect firing event by comparing intensities in the images acquired in both spectral bands. Other SWIR wavelengths are also contemplated as for example the SWIR band 2 µm-2.5 µm or a sub-band within said SWIR band. Also, other sub-bands within the visible band are contemplated. It is noted that the long and short wavelength bands may have no overlap. The long and short wavelength bands may be separated by a significant wavelength gap between the end of the short wavelength band and the beginning of the long wavelength band. In the following, the term visible band may be understood as referring to electromagnetic radiations of a wavelength comprised between 0.4 µm and 0.7 µm, the term UV-visible-NIR may refer to a wavelength comprised between 0.3 µm and 0.8 µm and the shortwave infrared may refer to a wavelength between 1.0 µm and 2.5 µm. It is submitted that muzzle flashes can be efficiently detected using dual band imaging by detecting whether a ratio between the irradiance collected in the long wavelength band and the irradiance change collected in the short wavelength band for a corresponding area of the dual band images meets a predefined threshold. Indeed, the Applicant has found that muzzle flashes may be modeled as black or grey-body emitters with an effective temperature of around 1200K-2500K which have extremely low emission in the short wavelength band. FIG. 1 illustrates approximately Planck curves for a temperature of 6000K which is characteristic of direct sun illumination and for temperatures of 1500K, 2000K and 2500K which have been found to be characteristic of muzzle flash events. As can be seen in FIG. 1, muzzle flashes can be distinguished from direct illumination by analyzing a spectral irradiance distribution because a ratio between the irradiance collected in the long wavelength band B1 and the irradiance collected in the short wavelength band B2 for muzzle flash and detonation events is particularly large, typically greater than 20, and thereby characteristic (distinctive) of muzzle flashes.

The Applicant has also found that the characteristic ratio between the irradiance collected in the long wavelength band B1 and the irradiance collected in the short wavelength band B2 can also enable distinguishing muzzle flashes from indirect (reflected) illumination in most situations. FIG. 2 illustrates schematically an imaging system according to the present disclosure receiving indirect illumination from sunlight reflection from a reflecting object. As illustrated, the imaging/detection system (hereinafter the term imaging/detection system, imaging system and detection system may be used interchangeably) is intended to be used with a line of sight (LOS) approximately horizontal. In certain embodiments, the LOS may be inclined of around 5±5 degrees, ±10 degrees, ±15 degrees or of around ±20 degrees. As stated above, the Applicant has found that most parameters influencing indirect illumination (from natural or artificial sources) like incidence angle, surface geometry or surface material, etc. do not compromisingly alter the characteristic ratio discussed above because in common conditions the ratio stays typically large. Therefore, in most situations, by analyzing the spectral irradiance distribution, it is possible also to distinguish reflected light from muzzle flashes.

The Applicant has also found that for certain objects, the SWIR band reflectance may be greater than the visible band reflectance by a possible factor of 4. Such objects may for example be green vegetation such as conifer trees, green rye grass or deciduous trees. However, within this magnitude, it is contemplated that such reflectance variations between the SWIR band and the visible band do not compromisingly alter the characteristic ratio discussed hereinabove and do not give rise to false detection. More details on the man made objects and natural objects which present reflectance variations between the SWIR band and the visible band are discussed in more details in the Article published in the name of the Applicant "*New applications with a SWIR imager employing long wavelengths*", Proc of SPIE Vol. 8012 by Gil A. Tidhar and Ram Segal which is hereby incorporated by reference.

However, the Applicant has additionally found that surface roughness of an object reflecting light is a parameter of indirect illumination which can alter compromisingly the characteristic ratio such that reflected light from certain surfaces can produce false positive responses with the contemplated flash detection method. Indeed, for certain roughness values the long wavelength band is predominantly reflected in certain directions in comparison with the short wavelength band. As will be detailed hereinafter, the imaging system presently disclosed may provide a linear polarizer oriented vertically in the long wavelength channel of the imaging system. This may give rise to a spectral irradiance distribution which resembles to muzzles flashes. More explanations are provided below in relation to FIGS. 3A-3C which illustrate three different regimes for indirect illumination. In FIGS. 3A-3C, the light rays represented in plain lines correspond to the long wavelength electromagnetic radiation, for example of wavelength $\lambda_1=1.6$ µm, and the light rays represented in hashed lines correspond to the short wavelength electromagnetic radiation, for example of wavelength $\lambda_2=0.5$ µm. FIG. 3A illustrates reflection on a smooth surface. A smooth surface may be defined as a surface whose roughness (RMS) is at least one order of magnitude smaller than the wavelength of the short wavelength radiation. In the example illustrated above, a smooth surface may be of a roughness of about $\sigma=0.05$ µm. It is noted that surface roughness may be defined using an amplitude parameter such as a root mean square of vertical deviations from a mean surface. Reflection of the long and short wavelength radiations on the smooth surface constitutes a specular regime in which both radiations are reflected according to Snell-Descartes laws. It is noted that because the short and long wavelength radiations are reflected in a similar manner, indirect illumination under specular regime does not alter the spectral irradiance distribution and therefore do not affect the contemplated analysis method. This analysis assumes the surface of the reflecting object is made of material(s) whose optical index of refraction—$n(\lambda)$—changes slowly with wavelength $\lambda$.

FIG. 3B illustrates reflection on a strongly rough surface. Pursuing the example described above, the roughness of the surface may be of about $\sigma=5$ µm. Reflection of long and short wavelength radiations on the strongly rough surface constitutes a diffuse regime in which both radiations are reflected into a diffuse lobe. It is noted that because the short and long wavelength radiations are reflected in a similar manner, indirect illumination under a diffuse regime does not alter the spectral irradiance distribution either.

FIG. 3C illustrates reflection on a surface of intermediate roughness i.e. a roughness in between (or close to) the short and/or long wavelengths. Continuing with the above described example, the roughness of the surface may be of $\sigma=0.2$ µm-1 µm RMS. As illustrated, intermediate roughness may give rise to a mixed regime where the long wavelength radiation is specularly reflected because the roughness RMS is still sufficiently smaller than the long wavelength and the short wavelength radiation is reflected in a diffuse regime. It is noted that because the short and long wavelength radiations are not reflected in a similar manner and the long wavelength radiation can be intensely more reflected in the specular direction in comparison with the short wavelength radiation, that indirect illumination under a mixed regime can alter the spectral irradiance distribution to an extent that indirect illumination on intermediately rough surfaces can produce false positive responses in the above described analysis method based on checking the ratio between long wavelength irradiance and short wavelength irradiance.

The Applicant has also found that introducing a polarizer upstream of the long wavelength band channel enables filtering out the specular reflection and therefore avoiding false positive response caused by intermediately rough surfaces. In some embodiments, the polarizer may be configured to only filter out the long wavelength band channel i.e. without filtering the short waveband channel. It is noted that the term upstream is understood herein with reference to a propagation direction of light i.e. the polarizer is mounted in front of the imaging sensor such that light is propagated through the polarizer on its way to the imaging sensor. Further, the polarizer may be oriented vertically.

With reference again to FIG. 2, as illustrated, the imaging system addresses notably an issue which may be mainly problematic when irradiance from the sun is high, for example when the sun is close to nadir situation. Indeed, the effects of the mixed regime seem most important when the sunlight irradiance at the ground is highest—which is when the sun disk zenith angle is small (or its elevation angle above the true horizon is larger than 30 degrees). The detection/imaging system is typically operated when mounted on a ground or sea mobile platform which holds the imaging system typically horizontally i.e. the detection/imaging system is intended to be used so that an optical axis (line of sight) of the imaging system is in a plane substantially parallel (i.e. in the range ±20, +15, ±10 degrees or ±5 degrees) to the horizontal (East/North) plane in a North/East/Up referential frame at the location of the imaging/detection system. In order for the specular reflections off the surface of an object in the common FOV scene to reach the aperture of the imaging/detection system—the reflecting surface may be inclined at half the sun-elevation-angle, with respect to the line-of-sight of the imaging/detection system that is essentially horizontal. In such configurations, light reflected from the scene and incident in the imaging system may be polarized (or at least partially polarized) in a direction perpendicular to the incident plane (plane including the incident ray from the sun and the normal to the reflecting object surface) i.e. generally included in the horizontal plane. Therefore, in this way the orientation of the filter polarization direction can be preset according to the presumed geometry of the scenario. In particular, the orientation of the polarizer may be set vertical.

In some embodiments, the system may be configured to operate under the Neymann-Pearson detector regime. In this regime, the rate of declarations about events that may be candidates for a real muzzle-flash and/or detonation is held within predefined boundaries (min,max) as set by the system hardware and software resources. The threshold may be varied (e.g. increased when the rate is too high, or decreased when the rate is too low) such as to keep the rate within these boundaries.

Therefore, the present disclosure provides a multiband imaging system comprising an optical module configured for acquiring simultaneously images from a common field-of-view (FOV) scene in a short wavelength spectral band and in a long wavelength spectral band, the optical module comprising a polarizer configured for applying polarization filtering to electromagnetic radiation of the long wavelength spectral band; and a processing module configured to analyze data indicative of received irradiance distribution between the short and long wavelength spectral bands.

In some embodiments, the processing module is further configured to detect a section of the common FOV scene in which a ratio between an irradiance in the long wavelength spectral band and an irradiance in the short wavelength spectral band exceeds a predetermined threshold.

In some embodiments, the short wavelength spectral band is within a visible band or UV-visible-NIR and the long wavelength spectral band is within a shortwave infrared band.

In some embodiments, the long wavelength spectral band and the short wavelength spectral band do not overlap.

In some embodiments, the long wavelength spectral band is approximately 1.5 µm to 1.7 µm and the short wavelength spectral band is approximately 0.5 µm to 0.6 µm.

In some embodiments, the optical module comprises a first channel comprising a first focal plane array configured to sense electromagnetic radiation in the long wavelength spectral band; a second channel comprising a second focal plane array configured to sense electromagnetic radiation in the short wavelength spectral band; wherein the first and second focal plane arrays are configured so that a defined mapping links corresponding pixels of the first and second focal plane arrays, the corresponding pixels imaging similar field directions in a field of view of the imaging system when the imaging system is operated; and wherein the polarizer is arranged in the first channel upstream of the first focal plane array.

In some embodiments, the processing module is configured to compute for at least some corresponding pixels, a ratio between corresponding pixels received irradiances.

In some embodiments, the processing module is further configured to detect if the ratio crosses a predefined threshold thereby detecting a field direction in the field of view of the optical detection system in which muzzle flash or detonation took place.

In some embodiments, the predefined ratio is adaptive so as to operate under the Neymann-Pearson detector regime.

In some embodiments, the processing module is further configured to estimate a blackbody effective temperature matching the received irradiance distribution from a detected muzzle-flash/detonation field direction.

In some embodiments, the polarizer is a polarizer configured to reject electromagnetic radiation of polarization different from a linear polarization of the polarizer.

In some embodiments, the linear polarization of the polarizer is vertical.

In some embodiments, the imaging system further comprises a housing defining a vertical orientation of the imaging system in standard condition and the polarizer is configured so that a linear polarization of the polarizer is parallel to said vertical orientation.

In some embodiments, the polarizer is configured so that a linear polarization of the polarizer stays approximately collinear with a gravitational field direction.

In some embodiments, the linear polarization of the polarizer is perpendicular to a plane containing the optical axes of the first and second channels.

In some embodiments, the polarizer is mounted retractably.

In some embodiments, the imaging system is configured to retract the polarizer at low ambient light condition and/or when sun-reflected light is not a significant part of the overall scene irradiance.

In another aspect, the present disclosure provides a detection method comprising simultaneously acquiring images from a common FOV scene in a short wavelength spectral band and in a long wavelength spectral band, while applying polarization filtering to electromagnetic radiation of the long wavelength spectral band, and generating data indicative of the acquired images; analyzing said data to determine a spectral irradiance distribution between the shortwave infrared and visible spectral bands; detecting one or more sectors of the common FOV scene for which a ratio between an irradiance in the long wavelength spectral band and an irradiance in the short wavelength spectral band exceeds a predefined threshold.

In some embodiments, the predefined threshold is adaptive so as to operate under the Neymann-Pearson detector regime.

In some embodiments, a polarization direction of the polarizer is oriented perpendicular to a horizontal plane.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
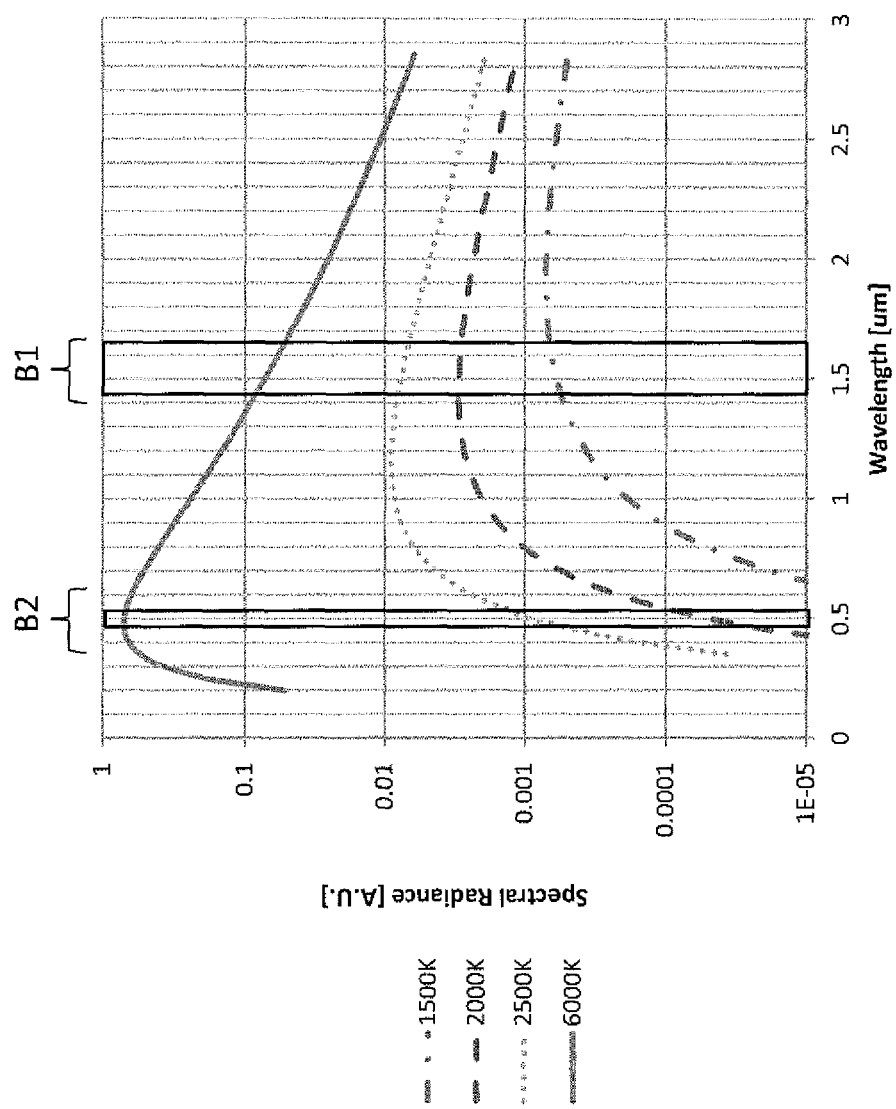
FIG. 1, previously described, illustrates schematically Planck curves for different blackbody temperatures.
Figure 2:
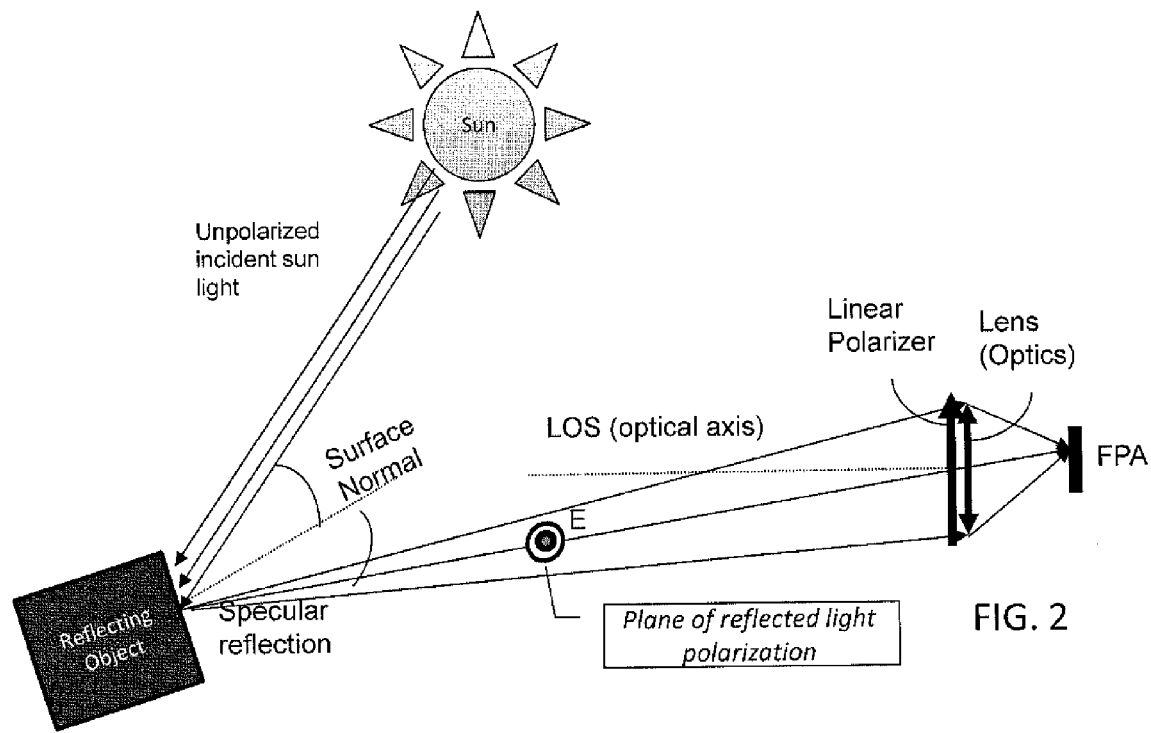
FIG. 2, previously described, illustrates schematically a detection system in a field of operation collecting sunlight reflected from a reflecting object according to embodiments of the present disclosure.
Figure 3A:
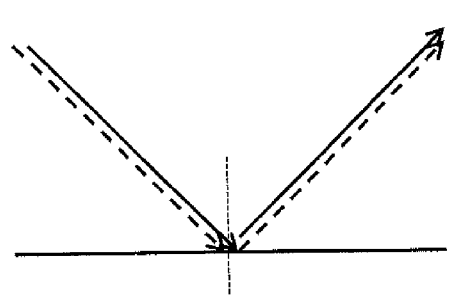
FIGS. 3A-3C, previously described, illustrate different modes of reflection for two electromagnetic radiations of different wavelengths off object surfaces having different roughness.
Figure 3B:
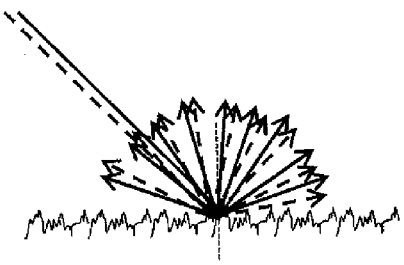
Figure 3C:
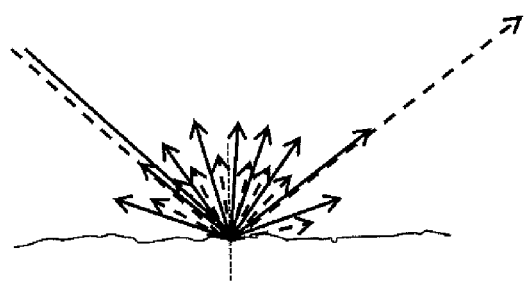

Described herein are some examples of systems and methods for analyzing a scene and detecting muzzle-flashes and detonations, i.e. fire events.

In the following detailed description, numerous specific details are set forth in order to provide a thorough understanding of the subject matter. However, it will be understood by those skilled in the art that some examples of the subject matter may be practiced without these specific details. In other instances, well-known methods, procedures and components have not been described in detail so as not to obscure the description.

As used herein, the phrase "for example," "such as", "for instance" and variants thereof describe non-limiting examples of the subject matter.

Reference in the specification to "one example", "some examples", "another example", "other examples, "one instance", "some instances", "another instance", "other instances", "one case", "some cases", "another case", "other cases" or variants thereof means that a particular described feature, structure or characteristic is included in at least one example of the subject matter, but the appearance of the same term does not necessarily refer to the same example.

It should be appreciated that certain features, structures and/or characteristics disclosed herein, which are, for clarity, described in the context of separate examples, may also be provided in combination in a single example. Conversely, various features, structures and/or characteristics disclosed herein, which are, for brevity, described in the context of a single example, may also be provided separately or in any suitable sub-combination.

As apparent from the following discussions, it is appreciated that throughout the specification discussions utilizing terms such as "generating", "determining", "providing", "receiving", "using", "transmitting", "performing", "forming", "analyzing", "or the like, may refer to the action(s) and/or process(es) of any combination of software, hardware and/or firmware. For example, these terms may refer in some cases to the action(s) and/or process(es) of a programmable machine, that manipulates and/or transforms data represented as physical, such as electronic quantities, within the programmable machine's registers and/or memories into other data similarly represented as physical quantities within the programmable machine's memories, registers and/or other such information storage, transmission and/or display element(s).

It is noted that in some embodiments, a dual band imaging/detection system according to the present disclosure may employ a SWIR band and a visible band to distinguish between optical radiance sources within an imaged scene which are likely to be active (e.g. hot) blackbody (or grey body) emitters with effective temperature in the range of 1200K-2500K from other optical sources.

In this connection, it is noted that the most abundant optical radiance sources within an imaged scene are generally those created by sunlight reflection. Sun irradiance, reaching a terrestrial object arrives as an essentially parallel beam of rays at a direction with respect to Earth horizon which is equal to the Sun elevation angle (also referred to as zenith angle) in a common geodesic East/North/Up referential. Further, it is noted that sun irradiance is non polarized.

Incident sun irradiance spectrum at ground altitudes on Earth can be effectively modeled as a grey body with an effective blackbody temperature in the range of 5400K-5900K (depending on sun nadir angle, spectral band and weather conditions). As such, it can be effectively distinguished from blackbody/greybody emitters that are objects of interest by means of the multi band imaging system.

However, sunlight reflections off surfaces of a certain roughness may result in polarized and specular (glint) reflected light at long wavelength (e.g. SWIR), whereas reflection of visible band light from the same surfaces would result in scattering into a large cone (i.e. diffused) and essentially non polarized.

When the dual band imaging system is located at the direction of the specularly reflected long wavelength light, it would measure significantly stronger long wavelength irradiance at the optics aperture, than it would have for a diffused or Lambertian reflection. Calculations show that in such conditions, the long wavelength irradiance may be as much as six times stronger than without the specular reflection. This may distort the relative distribution of optical power as received between the different wavelength bands and may lead to an erroneous classification of the imaged object (reflection surface) as an object of interest.

Since the specular reflected light may be polarized, the Applicant has found that it can be attenuated by incorporating a polarizer in the optical chain of the long wavelength imaging channel.

Firstly, it is noted that objects of interest emit unpolarized light—hence incorporation of a polarizer in the long wavelength optical detection means should attenuate the received irradiance from such sources in a known way—50% attenuation due to linear polarization and additional known attenuation due to polarizer transmission or absorption effects that are not related to polarization. This attenuation may be compensated by using either sensor signal integration time, aperture diameter, and/or numerical calculation in the signal processor.

Secondly, it is noted that for reflected light in the visible band light is expected to be essentially unpolarized if it is reflected off a polished metal surface or from a rough (compared to the wavelength) dielectric surface.

Thirdly, for reflected light in the long wavelength band (SWIR): When light is reflected off rough surfaces, or from non-dielectric surfaces, or at steep angles (w.r.t surface normal), the reflected light is expected to be essentially unpolarized and therefore its reception is not modified in a significant manner. When light is reflected off smooth ($\sigma \leq 0.5$ µm) surfaces such as a car's exterior and painted surfaces, reflected light is expected to be essentially polarized and specular. In this case, a polarizer, if aligned such that its polarization plane is misaligned with the reflected light direction of polarization, would significantly attenuate the specular reflected light.

Fourthly, in practical and most frequent scenarios, the line of sight of the optical imaging means would be almost parallel to the horizon. Sun irradiance is maximum, when the sun is high in the sky (zenith elevation angle close to nadir). On such occasions, specularly reflected light that can be received by the optical imaging (detection) means would have its plane of polarization essentially in the horizontal direction.

Therefore, the present disclosure contemplates having a linear polarizer in the long wavelength reception channel. Therefore, by using the imaging system such that an optical axis of the system is substantially parallel to the ground and the linear polarizer (direction of the transmitted polarization) is substantially perpendicular to the ground, the desired effect of attenuating the long wavelength specularly reflected light by surfaces of "intermediate roughness" may be achieved.

In some embodiments, the polarizer may be configured so that the linear polarization direction is vertical In some embodiments, the polarizer may be configured so that the linear polarization direction stays parallel to the gravitational field.

In some embodiments, the imaging system may be configured so that a linear polarization direction of the polarizer which is transmitted through the polarizer is substantially perpendicular to a plane containing the first and second optical axes of the short and long wavelength channels.

In some embodiments, the system may further comprise a housing. The housing (for example its shape) may define a vertical axis of the imaging system. The vertical axis of the imaging system may refer to a position of the imaging system when used in standard conditions i.e. a light of sight parallel to the ground (and predefined roll). The polarizer may be configured so that a polarization direction is (substantially) parallel to the vertical orientation of the imaging system. For example, the housing may include a flat support surface (lower or upper surface) for supporting the imaging system and the polarization direction of the polarizer may be perpendicular to the support surface.

In some embodiments, the imaging/detection system may be mounted on a pan/tilt unit so as to be positioned according to a desired line of sight. The polarizer may be configured so that an orientation of the polarizer stays perpendicular to the line of sight plane. However, it is noted that even if the LOS of the optical detection/imaging system is not horizontal—the loss of performance is only degraded with inclination angle (theta) of the LOS (with respect to horizon)—practically the specularly reflected light component shall be amplified as sin(theta).

Figure 4:
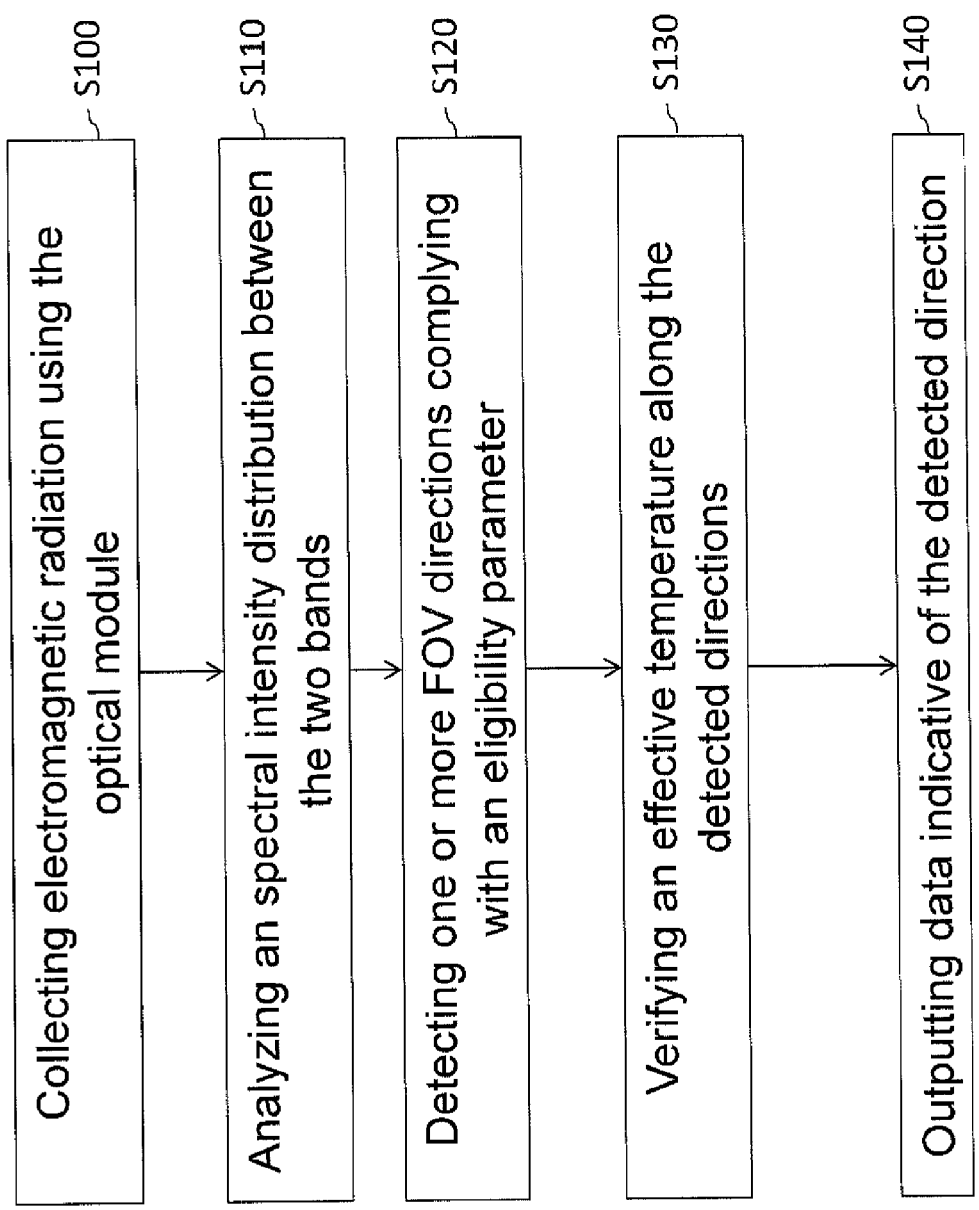
FIG. 4 illustrates steps of a method of detecting muzzle-flashes and detonations according to embodiments of the present disclosure.

FIG. 4 illustrates steps of a method useful for detecting muzzle-flash and detonation events. In a first step S100, electromagnetic radiations may be collected using a dual (or at least dual) band optical system. The dual band optical system may include a short wavelength and long wavelength channels and a polarizer arranged upstream of the long wavelength channel so that light is propagated through the polarizer on its way to an imaging sensor (focal plane array) of the long wavelength channel. Each source area within a field of view of the dual band optical system may be associated with a short wavelength pixel irradiance collected on a pixel of a short wavelength focal plane array (FPA) of the short wavelength channel and a long wavelength pixel irradiance collected on a corresponding pixel of a long wavelength focal plane array (FPA) of the long wavelength focal plane array (FPA). It is noted that the term "corresponding pixels" refers to respective pixels from the short and long wavelength focal plane array (FPA)s which image an identical area of a scene when the dual band optical system is operated i.e. used to image a scene. Corresponding pixels may also be understood as pixels whose field direction does not deviate by more than ½ of their Instantaneous Field of View (IFOV) along pitch and yaw. In a second step S110, a spectral irradiance distribution between the two spectral bands may be analyzed. The spectral irradiance distribution may be expressed as a ratio between corresponding pixel intensities in the long wavelength band and in the short wavelength band. In a third step S120, one or more area complying with a eligibility parameter may be detected. The eligibility parameter may be expressed as a threshold value. An area may be deemed to comply with the eligibility parameter if the calculated ratio meets for example exceeds) the threshold value. As explained hereinabove, the Applicant has found that flashes are characterized by a very high ratio between the long wavelength irradiance and the short wavelength irradiance. In a fourth optional step S130, an effective temperature of one or more detected (eligible) area may be computed to verify if the effective temperature is coherent with a fire event. It is reminded that a firing event behaves like a blackbody or grey body emitter of around 1200K-2500K. This leads to obtain one or more verified areas. In a fifth step S140, data indicative of the detected area and/or of the checked area may be outputted so as to enable appropriate action to be taken if a fire event is detected.

Figure 5:
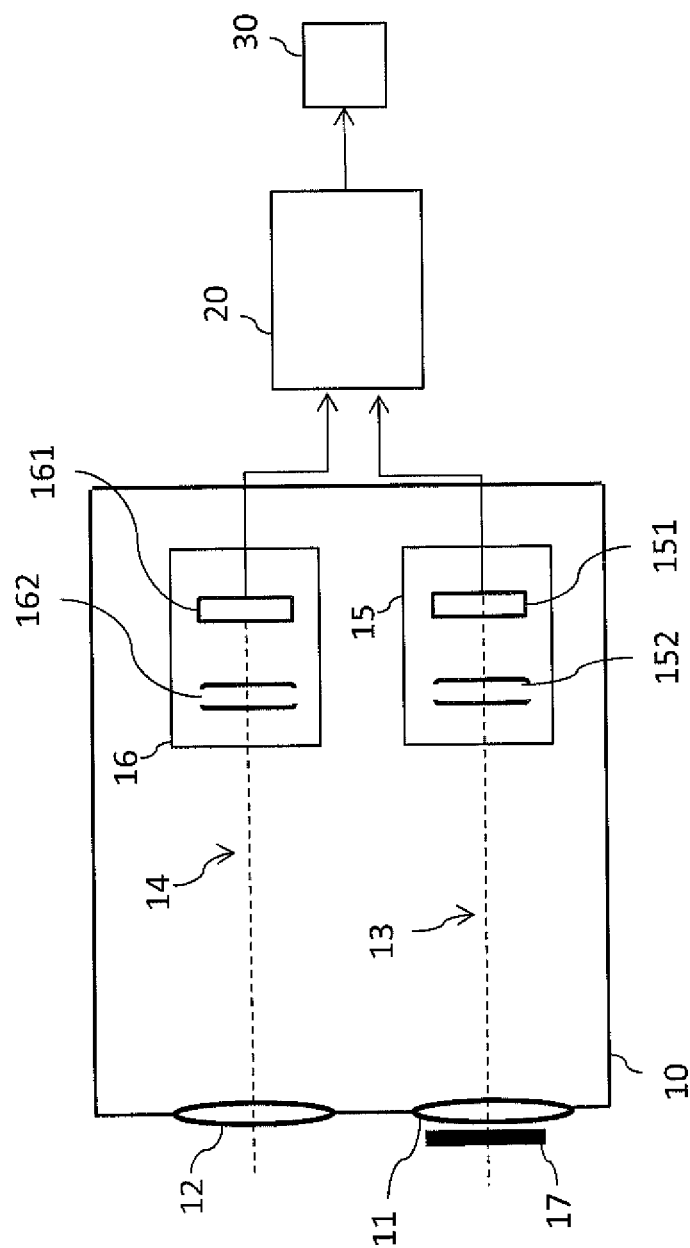
FIG. 5 illustrates elements of a detection/imaging system according to some embodiments of the present disclosure.

FIG. 5 illustrates elements of a imaging/detection system for detecting fire events according to some embodiments of the present disclosure. The system may include an optical module 10 and a processing module 20. The processing module 20 may provide data indicative of detection of firing events to an output module 30 by performing some of the steps of the method previously described. The optical module 10 may be a dual band imaging system. The optical module may enable simultaneous acquisition of a common scene in two separate spectral band, a short wavelength spectral band, for example a visible band, and a long wavelength spectral band, for example a SWIR band. In some embodiments, the optical module may comprise a first channel 13 and a second channel 14. The first and second channels 13, 14 may be configured for respectively acquiring the images on the long wavelength band and on the short wavelength band. The first channel 13 may comprise a first optics 11 and a first imaging module 15. The second channel 14 may comprise a second optics 12 and a second imaging module 16. The first and second optics 11, 12 may be configured side by side so that the optical axes of the first and second optics 11, 12 are offset and approximately parallel. The first and second imaging modules 15, 16 may respectively include a first focal plane array 151 configured to sense electromagnetic radiation in the long wavelength spectral band and a second focal plane array 161 configured to sense electromagnetic radiation in the short wavelength spectral band. Furthermore, additional optics 152, 162 may be added to improve image acquisition in the first and second imaging modules 15, 16. The first and second focal plane arrays (FPA) 151, 161 may be configured so that a defined mapping links corresponding pixels imaging similar source areas in a field of view of the system (dual band imaging system) when the system is operated. In other words, the dual band imaging system may be spatially registered. A polarizer 17 may be configured for filtering electromagnetic radiation of the long wavelength spectral band. The polarizer may be arranged on the first channel, upstream of the first focal plane array 151. The polarizer 17 may be configured upstream (before with respect to light trajectory) of the first optics 11. This enables avoiding a change of polarization of the light before it reaches the polarizer 17.

In some embodiments, the polarizer 17 may also be configured for filtering the short wavelength spectral band. The polarizer 17 may be a linear polarizer. The polarizer 17 may be configured so that a linear polarization which is transmitted through the polarizer is perpendicular to a line of sight direction (or optical axis) of the optical module 10.

Further, the polarizer 17 may be configured so that a linear polarization direction of the polarizer 17 which is transmitted through the polarizer is substantially perpendicular to a plane containing the first and second optical axes of the first and second optics 11, 12.

The optical module 10 may further comprise a housing. The housing (for example its shape) may define a vertical axis of the optical module 10. The vertical axis of the optical module 10 may refer to a position of the optical module when used in standard conditions i.e. a light of sight parallel to the ground and predefined roll. The polarizer 17 may be configured so that a polarization direction is (substantially) parallel to the vertical orientation of the imaging module 10. For example, the housing may include a flat support surface (lower or upper surface) for supporting the optical module and the polarization direction of the polarizer may be perpendicular to the support surface. In some embodiments, the vertical direction of the optical module 10 defined by the housing may be perpendicular to the plane containing the optical axes of the first and second optics 11, 12.

The polarizer 17 may be configured so that an orientation of the polarization direction can be modified i.e. the polarizer 17 may be tiltable. The polarizer 17 may be configured so that the linear polarization of the polarizer stays (substantially) collinear with the gravitational field.

Further, the polarizer 17 may be mounted retractably and the system may be configured to retract the polarizer at low ambient light condition and/or when sun-reflected light is not a significant part of the overall scene irradiance.

The processing module 20 may be configured for analyzing an irradiance distribution between the short and long wavelength spectral bands. The spectral irradiance distribution may be expressed as a ratio between corresponding pixel intensities in the long wavelength band and in the short wavelength band. The processing module 20 may further be configured to detect one or more areas of the common scene for which a ratio between an irradiance in the long wavelength spectral band and an irradiance in the short wavelength spectral band exceeds a predetermined threshold. In some embodiments, the polarizer may be for example a polarizer such as the P/N HR from 3M made by American Polarizers Inc. or the P/N 54-112 by Edmund Optics. In some embodiments, the polarizer may be for example based on liquid crystal or birefringent crystal and may be controlled by electrical/thermal or stress/strain commands. The processing module 20 may further be configured for computing an effective temperature of the detected areas so as to verify if the effective temperature is coherent with a fire event. The verification enables to limit residual false positive responses and provide verified areas. Data indicative of the detected areas and/or verified areas may be provided as output to the output unit 30.

Figure 6:
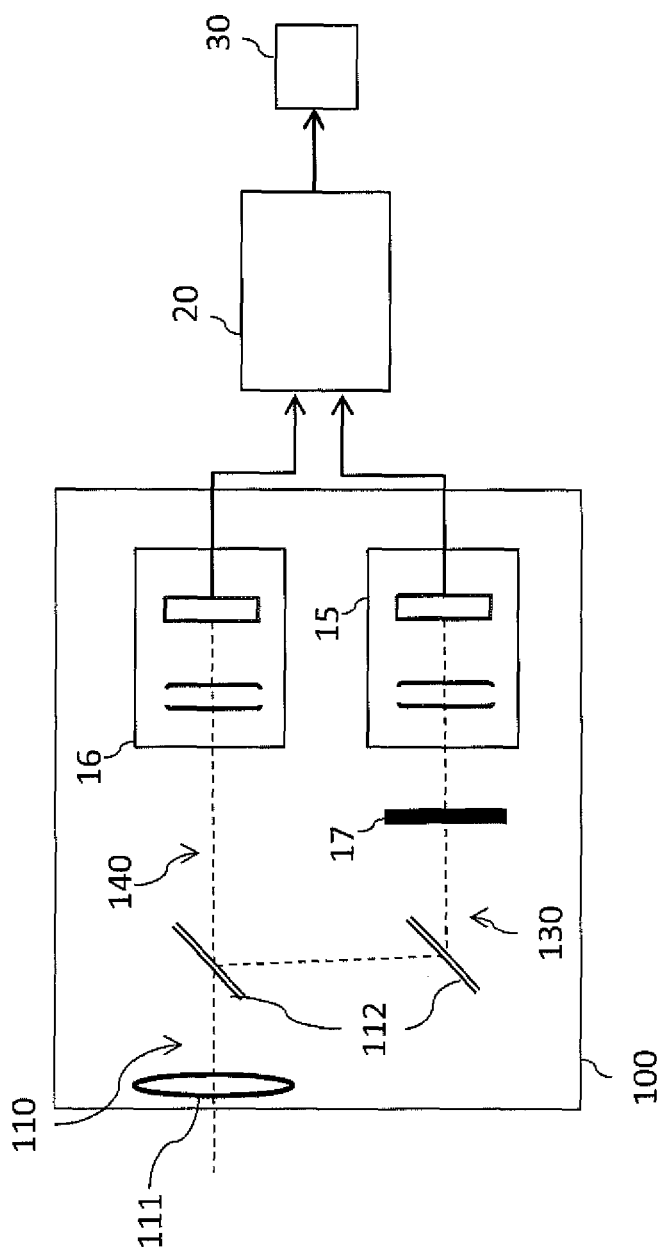
FIG. 6 illustrates elements of a detection/imaging system according to some embodiments of the present disclosure.

FIG. 6 illustrates a variant of the system illustrated on FIG. 5. For the sake of conciseness, certain similar elements already described with reference to FIG. 5 are not repeated. The elements represented by identical numerals on FIG. 5 and FIG. 6 are identical. FIG. 6 illustrates an alternative optical module 100 for the system of imaging/detection of detecting fire events according to the present disclosure. The optical module 100 has a folded optical configuration and is configured to enable simultaneous acquisition of a common scene in two separate spectral band, a short wavelength spectral band, for example a visible band, and a long wavelength spectral band, for example a SWIR band. The optical module 100 comprises a common channel 110, a first channel 130 and a second channel 140. The common channel 111 may comprise a common optics 111 and a beam splitter arrangement 112 configured for splitting the common channel 110 into the first and second channels 130, 140. In some embodiments, the beam splitter arrangement 112 may comprise a dichroic mirror and a standard mirror. The common optic 111 may be used as a single aperture for acquiring images in both spectral bands. The first and second channels 130, 140 may be configured for respectively acquiring the images on the long wavelength band and on the short wavelength band.

The first and second channels may respectively include a first imaging module 15 and a second imaging module 16. The first and second imaging module 15, 16 may be spatially registered.

A polarizer 17 may be configured for filtering electromagnetic radiation of the long wavelength spectral band. The polarizer 17 may be a linear polarizer. The polarizer 17 may be arranged on the first channel, upstream of the first imaging module 15. The polarizer 17 may be configured upstream (before with respect to light trajectory) of the common optics 111.

The polarizer 17 may be configured so that a linear polarization which is transmitted through the polarizer is perpendicular to a line of sight direction (or optical axis) of the optical module 100. Further, the polarizer 17 may be configured so that a linear polarization direction of the polarizer 17 which is transmitted through the polarizer is substantially perpendicular to a plane containing the first and second optical axes of the first and second imaging modules 15, 16 i.e. the central axes with respect to the focal plane arrays.

The optical module 10 may further comprise a housing (not shown). The housing may be configured so as to define a vertical direction for the optical module 10. The vertical direction of the optical module 10 may refer to a preferential operating/holding direction of the optical module in standard conditions. The polarizer 17 may be configured so that a polarization direction is (substantially) parallel to the vertical axis of the imaging module 10. In some embodiments, the vertical direction of the optical module 10 defined by the housing may be perpendicular to the plane containing the optical axes of the first and second imaging modules 15, 16.

The polarizer 17 may be configured so that an orientation of the polarization direction can be modified i.e. the polarizer 17 may be tiltable. The polarizer 17 may be configured so that the linear polarization of the polarizer stays (substantially) collinear with the gravitational field.

Further, the polarizer 17 may be mounted retractably and the system may be configured to retract the polarizer at low ambient light condition and/or when sun-reflected light is not a significant part of the overall scene irradiance.

The processing module 20 and the output unit 30 (which may not be part of the detection/imaging system) may be configured as previously described, in particular with reference to FIG. 5.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It will be appreciated that the embodiments described above are cited by way of example, and various features thereof and combinations of these features can be varied and modified.

While various embodiments have been shown and described, it will be understood that there is no intent to limit the invention by such disclosure, but rather, it is intended to cover all modifications and alternate constructions falling within the scope of the invention, as defined in the appended claims.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A multiband imaging system for detecting muzzle flashes, comprising:
   a short wavelength imaging module configured for acquiring an image in a short wavelength;
   a long wavelength imaging module configured for acquiring an image in a long wavelength,
   where the short wavelength and long wavelength imaging modules simultaneously acquire images from a common field-of-view (FOV) scene in a short wavelength spectral band and in the long wavelength spectral band, respectively;
   a polarizer configured for applying polarization filtering to electromagnetic radiation of a long wavelength spectral band entering the long wavelength imaging module to filter out specular reflections from surfaces having roughness close to the short wavelength and smaller than the long wavelength; and
   a processing module configured to analyze data indicative of received irradiance distribution between the short and long wavelength spectral bands for determining the muzzle flashes.

2. The system according to claim 1, wherein the processing module is further configured to detect a section of the common FOV scene in which a ratio between an irradiance in the long wavelength spectral band and an irradiance in the short wavelength spectral band exceeds a predetermined threshold.

3. The system according to claim 1, wherein the short wavelength spectral band is within a visible band or UV-visible-NIR and the long wavelength spectral band is within a shortwave infrared band.

4. The system according to claim 1, wherein the long wavelength spectral band and the short wavelength spectral band do not overlap.

5. The system according to claim 1, wherein the long wavelength spectral band is approximately 1.5 μm to 1.7 μm and the short wavelength spectral band is approximately 0.5 μm to 0.6 μm.

6. The system according to claim 1, wherein:
the long wavelength imaging module includes a first channel including a first focal plane array configured to sense electromagnetic radiation in the long wavelength spectral band;
the short wavelength imaging module includes a second channel including a second focal plane array configured to sense electromagnetic radiation in the short wavelength spectral band;
wherein the first and second focal plane arrays are configured so that a defined mapping links corresponding pixels of the first and second focal plane arrays, the corresponding pixels imaging similar field directions in a field of view of the imaging system when the imaging system is operated; and
the polarizer is arranged in the first channel upstream of the first focal plane array.

7. The system according to claim 6, wherein the processing module is configured to compute for at least some corresponding pixels, a ratio between corresponding pixels received irradiances.

8. The system according to claim 7, wherein the processing module is further configured to detect if the ratio crosses a predefined threshold thereby detecting a field direction in the field of view of the optical detection system in which muzzle flash or detonation took place.

9. The system according to claim 8, wherein the predefined ratio is adaptive so as to operate under a Neymann-Pearson detector regime.

10. The system according to claim 8, wherein the processing module is further configured to estimate a blackbody effective temperature matching the received irradiance distribution from a detected muzzle-flash/detonation field direction.

11. The system according to claim 1, wherein the polarizer is configured to reject electromagnetic radiation of polarization different from a linear polarization of the polarizer.

12. The system according to claim 11, wherein the linear polarization of the polarizer is vertical.

13. The system according to claim 11, wherein the imaging system further comprises a housing defining a vertical orientation of the imaging system in standard condition and the polarizer is configured so that the linear polarization of the polarizer is parallel to the vertical orientation.

14. The system according to claim 11, wherein the polarizer is configured so that the linear polarization of the polarizer stays approximately collinear with a gravitational field direction.

15. The system according to claim 6, wherein
the polarizer is configured to reject electromagnetic radiation of polarization different from a linear polarization of the polarizer, and
the linear polarization of the polarizer is perpendicular to a plane containing optical axes of the first and second channels.

16. The system according to claim 1, wherein the polarizer is mounted retractably.

17. The system according to claim 16, further configured to retract the polarizer at a low ambient light condition and/or when sun-reflected light is not a significant part of an overall scene irradiance.

18. A detection method for detecting muzzle flashes, comprising:
simultaneously acquiring images from a common FOV scene in a short wavelength spectral band using a short wavelength imaging module and in a long wavelength spectral band using a long wavelength imaging module, while applying polarization filtering to electromagnetic radiation of the long wavelength spectral band entering the long wavelength imaging module to filter out specular reflections from surfaces having roughness close to the short wavelength and smaller than the long wavelength, and generating data indicative of the acquired images;
analyzing the data to determine a spectral irradiance distribution between shortwave infrared and visible spectral bands;
detecting one or more sectors of the common FOV scene for which a ratio between an irradiance in the long wavelength spectral band and an irradiance in the short wavelength spectral band exceeds a predefined threshold for determining the muzzle flashes.

19. The detection method according to claim 18, wherein the predefined threshold is adaptive so as to operate under a Neymann-Pearson detector regime.

20. The method according to claim 18, wherein a polarization direction of a polarizer that applies the polarization filtering is oriented perpendicular to a horizontal plane.

21. The method according to claim 20, further comprising:
retracting the polarizer at a low ambient light condition and/or when sun-reflected light is not a significant part of an overall scene irradiance.

* * * * *